Nov. 18, 1958  J. W. CASE  2,860,450

METHOD FOR COATING GLASS FIBERS

Original Filed Feb. 25, 1953  2 Sheets—Sheet 1

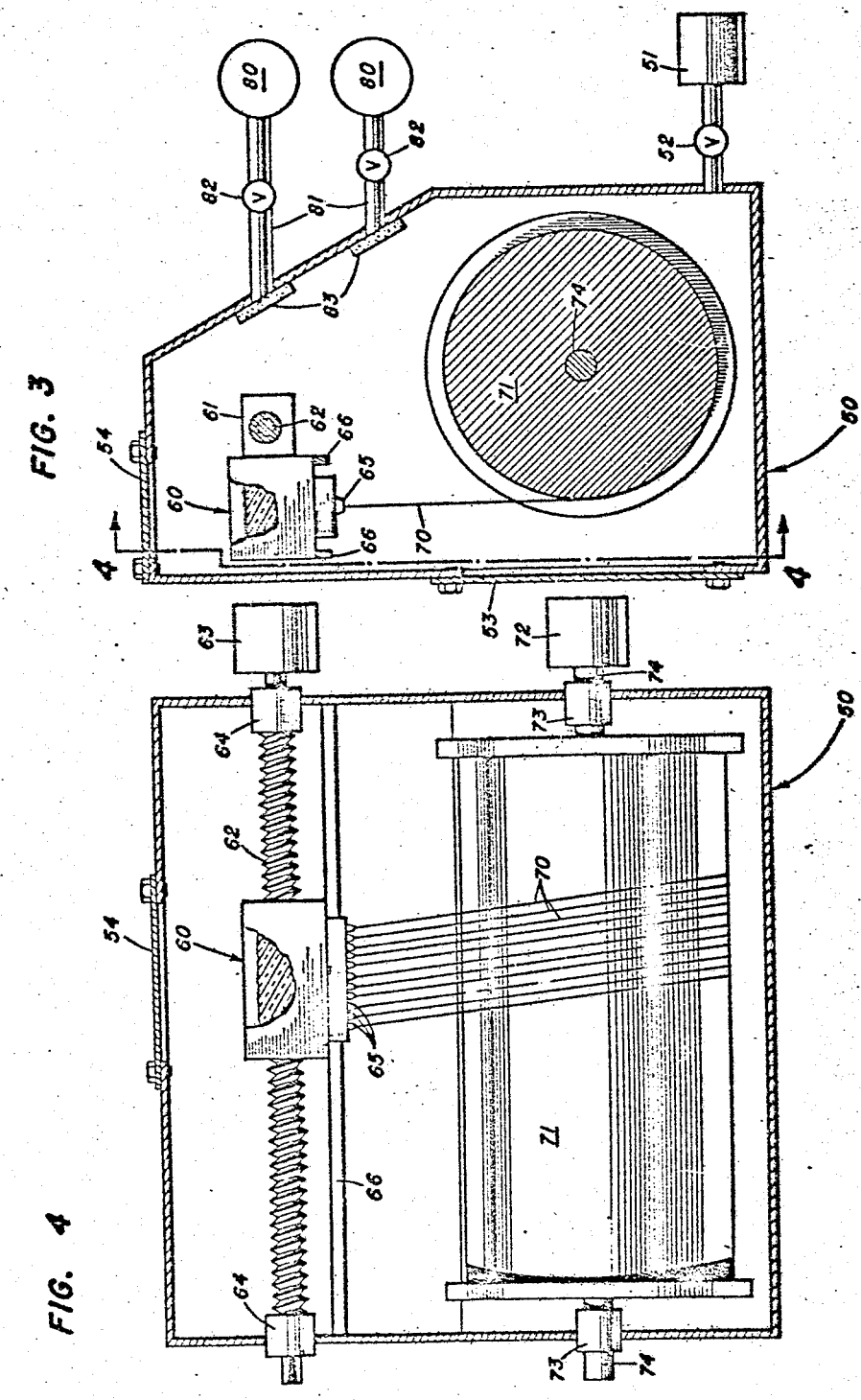

United States Patent Office 2,860,450
Patented Nov. 18, 1958

2,860,450

METHOD FOR COATING GLASS FIBERS

James W. Case, Fairfax, Va.

Original application February 25, 1953, Serial No. 338,924. Divided and this application January 10, 1956, Serial No. 558,391

3 Claims. (Cl. 49—77)

(Granted under Title 35, U. S. Code (1952), sec. 266)

The invention described herein may be manufactured and used by or for the Government of the United States of America for governmental purposes without the payment of any royalties thereon or therefor.

This application is a division of copending application Serial No. 338,924 for Method and Apparatus for Coating Glass Fibers, filed February 25, 1953.

The present invention relates generally to the coating of fibers or filaments, and more particularly to a method for obtaining an intimate bond between the coating material employed and the fiber, when the fiber is formed of glass or a similar ceramic material.

Numerous methods and various types of apparatus are currently known and employed for the purpose of producing coated glass filaments or fibers. But heretofore this art has been directed principally to producing ornamental effects upon the glass, such as colored or mirrored surfaces, protecting the glass fibers from abrasion and the like, imparting desired electrical characteristics to the strand, and other nonstructural purposes. The process comprising the subject matter of the present invention, however, contemplates that the coated fibers thereby produced would be useful for certain structural purposes, as in the form of mats, bats, laminates, or the like of the coated fibers formed by fusing or otherwise bonding the coated filaments together with a desired bonding material, or as a reinforcing fiber matrix for such substances as polymeric materials. For such purposes it is desirable that the strength of coated fibers so matted or the composite structure produced, approach that of the glass, or other similar material employed for the fiber, when measured by such characteristics as modulus of elasticity, modulus of rupture, ultimate elongation, and yield point. When dealing with coated fibers, however, it is apparent that the ultimate strength characteristics of the composite structure may depend upon the nature of the bond effected between the fiber base, reinforcement, or matrix and the coating applied thereto, particularly when the coating may readily slip or break away from the fiber.

In accordance with the present invention, it is therefore contemplated to produce coated filaments of glass or similar ceramic materials in such a manner that the coating is intimately and strongly bonded to the glass, so that the strength characteristics of the composite fiber or filament approaches that of the filament itself and is not seriously impaired by ready breaking or slipping of the bond between the coating and filament base. This coating may be accomplished with any number of recognized coating materials adapted to coating the particular fiber material, as will be hereinafter more fully exemplified, the choice of coating material being determined largely by the type of material to be used as the subsequent bonding material or the like with which the coated fibers are to be associated, it being apparent that the initial fiber coating material should be capable of forming an integral bond with the later applied bonding material.

The present invention is therefore concerned principally, although not exclusively, with the method for effecting the desired bond between the initial coating material and the fiber base. When molten glass is extruded, drawn, or otherwise extracted from a glass furnace, the surface of the glass as extracted from the melt possesses certain characteristics which facilitate or enable an intimate bonding between the glass and a coating material applied thereto. Upon the exposure of the extracted glass to air, however, a change in the characteristics of the glass rapidly occurs, with the result that the desired intimate bonding with a given coating material is substantially diminished. It is believed that this change in the characteristics of the glass fiber surface is effected principally by water vapor or moisture normally carried in the air, and in addition possibly by the action of oxygen thereon. It is known that on the drawing of glass fibers from a furnace, the impurities contained in the melt tend to concentrate on the surface; and it is further believed from experimental observations that small amounts of water vapor present in the atmosphere surrounding the drawn fibers tend through some mechanism to accumulate on and become associated with the surface of the glass fibers, and once so associated the moisture has not been successfully removed other than by remelting the glass. It is therefore concluded that the intimate bonding characteristic present in glass fibers as drawn from the melt is effected through the impurities present on the surface of the glass, but that the affinity for coating materials is adversely affected by the accumulation of water vapor on and/or in the surface of the glass, and to some degree by the action of oxygen thereon. In any event, the intimate bonding characteristic of the glass is derived from the nascency of the glass as drawn from the melt, while contact with water vapor and oxygen decreases this bonding characteristic. Therefore for the purposes of the present specification and appended claims, the glass as obtained from the furnace in its initial state of being receptive to intimate bonding, is referred to as being in a "nascent" state. Thus, the method of the present invention contemplates the application of the initial coating material to the glass filaments while the glass is still in its nascent state. The coating application may be effected by various processes known to the art such as metallizing, gas plating, dipping, vapor deposition, spraying, and the like. The glass fibers are retained in their nascent state essentially by exclusion of air and particularly water vapor and oxidizing gases therefrom between the period of extraction from the furnace and application of the desired coating.

It is therefore one object of the present invention to provide a method for coating glass fibers or filaments and the like.

Another object of the present invention is to provide a method for coating glass fibers or filaments which effects an intimate bond between the glass fiber base and coating material.

Another object of the present invention is to provide a method for coating glass fibers or filaments while in the nascent state.

Other objects and many of the attendant advantages of this invention will be readily appreciated as the same becomes better understood by reference to the following detailed description when considered in connection with the accompanying drawings wherein:

Fig. 3 is a vertical cross-sectional view of a second embodiment of a combined glass furnace and filament coating chamber of the present invention; and Fig. 4 is a view of the apparatus shown in Fig. 3 taken along the line 4—4 thereof.

Figure 1:
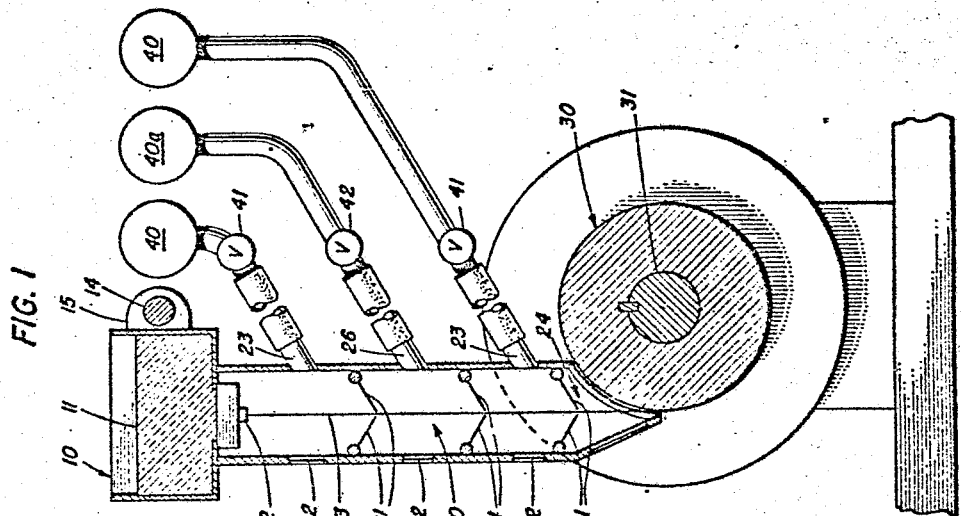
Fig. 1 is a vertical cross-sectional view through one embodiment of a combined glass furnace and filament coating chamber of the present invention.

As previously mentioned, the method of the present invention contemplates the coating of filaments or fibers of glass or the like, drawn or otherwise extracted from a glass furnace, while the glass is still in its nascent state, and by so coating a substantially more adherent or intimate bond is effected between the glass and coating material than is obtained with a given coating material applied to the glass after it has been exposed to air and particularly to water vapor and oxygen. The coating material may be any desired material adapted to coating glass, as for example: the polymeric synthetic resins such as the polyesters, phenolics, epoxies, and silicones; coating agents such a vinyl siloxene, and the chrome complexes; and metals such as copper, iron, and nickel. The particular mode of applying the various coating materials to the glass fibers is not of significance to the present process, and any of the conventional methods adaptable to the particular coating material as are known to the art may be employed, as for example spraying, electrostatic deposition, dipping, vapor deposition, and the use of aerosol borne particulates. However, it is preferred to employ a coating process whereby the filaments are merely passed through an atmosphere carrying finely divided particles or a vapor of the desired coating material, such as may be had from vapor deposition or the use of aerosols. Such preferred coating methods provide more uniform coating films on the fibers, and in view of the highly active condition of the glass fiber surfaces when in the nascent state, ready coating is had thereby.

As an adjunctive aspect of the coating step of the present method, as mentioned above, impurities in the glass melt tend to accumulate on the surface of the drawn fibers providing an active coating base; therefore to enhance the coating adherence selected impurities may be added to the melt, such as metals, metal oxides, salts, and the like, to provide a more plentiful base upon which the coating may bond. It is understood, however, that even in such instances of added impurities, it is necessary to coat while the fiber is in a nascent state in order to obtain the maximum bond strength between fiber and coating. It is further contemplated by the present invention that when employing the procedure of adding impurities to the glass melt, desired bonding characteristics may be enhanced by choosing the impurity with a view to the coating material. That is, the particular impurity chosen may be of such character as to itself be highly compatible, from the standpoint of bonding, with the coating material, or even be chemically reactive with the coating material when the fiber is extracted from the furnace so as to effect a chemical bond between the impurity and coating material. For example, when it is desired to coat with a metal, a metal oxide or reducible salt of the metal may be incorporated in the melt. The glass fibers may then be drawn into a reducing atmosphere where the salt or oxide impurity having concentrated on the surface of the fibers is reduced to the metal. Thereupon, the fibers are coated with a metal as by vapor deposition or the use of aerosols. The use of any desired combination of impurity and coating material may be employed in the same manner, as will be obvious to those skilled in the art, provided the components are not adversely affected by the heat of the glass furnace or the composition of the glass melt.

In order to effect a coating while the glass fibers are in a nascent state, it is preferred to draw the fibers from the glass furnace directly into an enclosed coating chamber where the coating step may be effected by any known and convenient means. In order to retain the glass in its nascent state until coating is complete, the coating chamber is maintained substantially free from air and particularly water vapor and oxidizing gases by either a pressure system, whereby a dry inert or reducing gas is used to flush the chamber, or by a vacuum system, whereby air, moisture, and oxidizing gases present are evacuated from the chamber prior to and, if desired, during the drawing of the filaments from the furnace. It is understood that desired desiccants may be employed in conjunction with the apparatus as deemed appropriate and as will be apparent to those skilled in the art. After the glass filaments are drawn and coated, they are collected and may then be utilized in bonded mats and/or as reinforcing fibers in a process of casting, molding, or otherwise forming an article from a material bondable with the particular coating applied to the glass.

Figure 2:
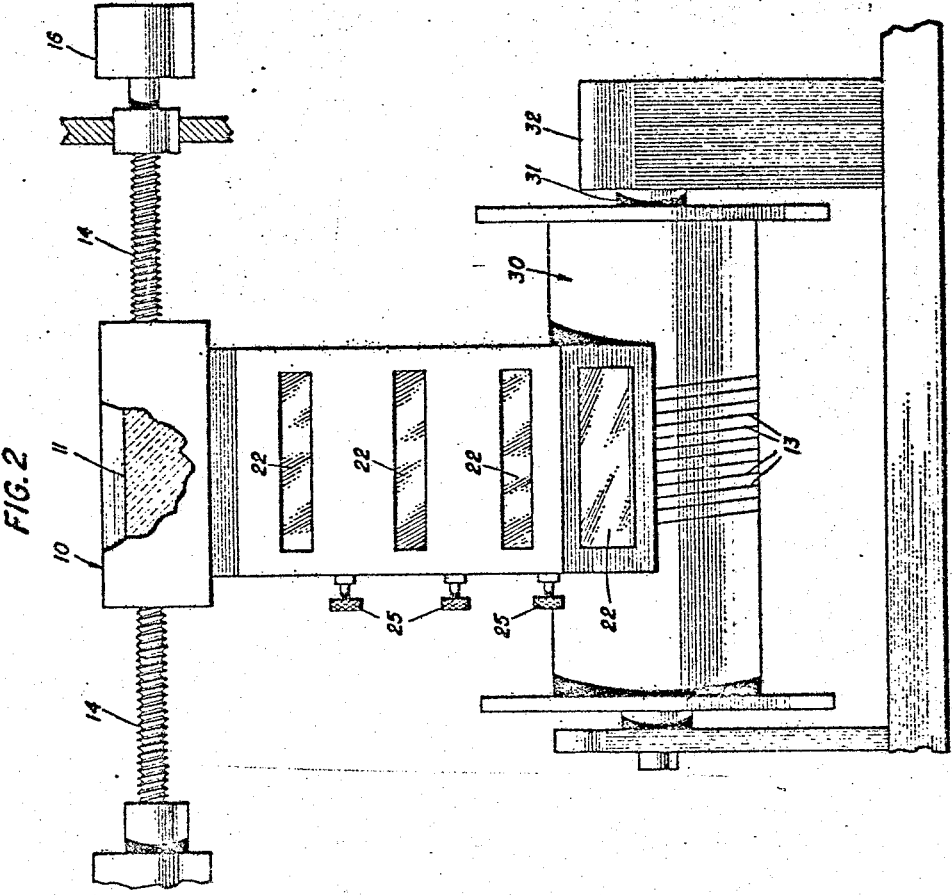
Fig. 2 is a front elevational view of the combined furnace and coating chamber of Fig. 1.

For the purpose of effecting the nascent glass coating method described hereinabove, there are presented two specific and exemplary embodiments of combined furnace and coating chamber adapted thereto, one embodiment illustrating a pressure system, and the other embodiment illustrating a vacuum system. The embodiment shown in Figs. 1 and 2 illustrates a pressure system for effecting the desired nascent glass coating, wherein numeral 10 denotes a glass furnace containing molten glass 11. The glass is drawn as filaments from a series of bushings or nipples 12 directly into the coating chamber 20 affixed to the underside of the furnace. The filaments 13 are then drawn through the coating chamber, out the opening 24 at the bottom thereof, and collected on winding reel 30 rotated by motor 32 and shaft 31. Where it is desired to wind the filaments 13 in helical fashion on drum 30, the furnace 10 and chamber 20 may be mounted upon a threaded traverse 14 by means of bracket 15 and driven by motor 16, which may be reversible if reciprocating traverse is desired. Also, if desired, the furnace traverse and winding drum may be operated from a single motor through an appropriate transmission where it is desired to retain a fixed relationship between drum rotation and furnace traverse, as is well-known in the art. As is further shown in the drawings, there is provided a source of dry inert or reducing gas such as generators 40 connected by flexible couplings to inlets 23 of the coating chamber, and controlled by valves 41, for flushing any air, moisture, or oxidizing gases out of the coating chamber and keeping the same free thereof during operation of the apparatus. To assist in maintaining the chamber 20 free of undesired gases, there may also be provided a plurality of adjustable gas seals 21 controlled by knobs 25. In order to observe the gas seal settings and the coating operation, several transparent windows 22 may be provided along the chamber 20. To coat the glass fibers 13 as they pass through the coating chamber, any type of coating apparatus adaptable to the chamber may be employed, as represented by the conduit 26 connected through a flexible coupling to a source of coating material supply 41a, such as an aerosol generator. The flow of coating material may be controlled by valve 42. Thus, it can be seen that as glass filaments or fibers are drawn from the glass furnace, they are drawn directly into coating chamber 20 which is maintained with a dry inert or reducing atmosphere, and the filaments are retained in this atmosphere until fully coated. There is thus effected a coating of the glass filaments while in the nascent state to obtain the desired intimate bonding effected by the method of the present invention.

It is understood that although it is indicated in Fig. 1 that the coating is applied in the middle section of chamber 20, it may be applied at any point in the chamber, although it is preferred to effect the coating as close as practical to the point of issue of the filaments from the furnace in order to derive the benefits of maximum nascency of the glass fibers. Also, any desired number of coating conduits, coating apparatuses, or other means may be provided along the path of chamber 20 for effecting any desired thickness of coating, or for effecting a plurality of different coatings. Where a metal oxide impurity has been added to the glass melt, as suggested above, the section of coating chamber 20 adjacent the furnace 10 may function as a reducing area when supplied with an appropriate reducing gas to convert the oxide to the metal on the fiber surface for reception of the coating material.

The second, or vacuum system embodiment of the present invention is illustrated in Figs. 3 and 4 of the drawings. As can there be seen, this embodiment comprises a substantially gastight chamber or enclosure 50 from which air, moisture, and other deleterious gases can be evacuated by such means as vacuum pump 51 controlled by valve 52. The chamber is further provided with access panels 53 and 54 which may be bolted or otherwise removably secured in a substantially gastight manner to the housing 50. The entire glass filament producing, coating, and collecting operation is performed within the chamber enclosure 50, for enclosed therein is the glass furnace 60, from whose bushings or nipples 65 are drawn the glass filaments 70 to be collected upon the winding drum 71 also contained within chamber 50. As in the case of the preceding embodiment, the furnace 60 may also be caused to reciprocate along guide tracks 66 by means of threaded traverse shaft 62 cooperating with bracket 61 and driven by reversing motor 63, the shaft 62 being provided with gastight shaft bearing seals 64 to retain the gastight characteristics desired of the chamber 50. Similarly, drum 71 is rotated for collecting the strands or filaments of glass 70 by means of shaft 74 and drive 72, shaft 74 also being provided with gastight bearing seals 73. In order to effect the desired coating of fibers 70 as they are drawn from furnace 60, there are provided sources of coating material supply 80, such as aerosol generators for carrying over particulates of the desired coating substance or substances, feeding into lines 81 leading to sintered metal filters 83 which disperse the particulates into chamber 50. In order to control the rate of feed of coating material into the chamber, valves 82 are provided in lines 81. As pointed out above, any known method of coating may be employed within and/or in conjunction with the sealed chamber 50, and the minor modifications of the chamber 50 necessary therefor will be readily apparent to those skilled in the art. Thus it can be seen, that by removal of access plates 53 and 54 the furnace can be charged, the winding drum set in place, and the apparatus readied for operation. The access plates are then replaced and substantially all air together with its moisture is evacuated from the chamber 50 by means of pump 51. Of course, if desired, moisture in the walls of the chamber may be minimized by baking and further evacuation. The drawing of the fibers 70 may then be effected as coating material is dispersed into chamber 50 through the sintered filters 83. In this manner, the drawn fibers in their nascent state, prior to contact with air, moisture, or other deleterious material or gases, are coated with a desired material in accordance with the above discussed method of the present invention. As is apparent, the present apparatus embodiment of Figs. 3 and 4, although described as a vacuum system, could be readily employed as a pressure system after initial evacuation, utilizing the pressure of generators 80. Also, the apparatus may be used as a balanced system after initial evacuation wherein the vacuum pump 51 may be operated as necessary to diminish the pressure created in the chamber by generators 80 as the chamber pressure exceeds a desired amount.

There is thus presented a method for coating glass fibers, which contemplates the coating thereof in the nascent state in order to effect an intimate bonding between the coating and the glass, and in addition, two embodiments of apparatus exemplary of combined furnace and coating chamber adapted to effect the instant process.

Obviously many modifications and variations of the present invention are possible in the light of the above teachings. It is therefore to be understood that within the scope of the appended claims the invention may be practiced otherwise than as specifically described.

What is claimed is:

1. A method of intimately bonding a coating to glass fibers comprising the steps of incorporating an impurity in the glass melt, and drawing the fibers in a nascent state from the melt through an atmosphere containing particles of a coating material, said impurity being chosen of a material readily bondable with the coating material.

2. A method of intimately bonding a coating to glass fibers comprising the steps of incorporating an impurity in the glass melt, drawing the fibers from a glass furnace, and passing the fibers in a nascent state through an enclosed atmosphere containing particles of a coating material, protecting the drawn fibers as the latter emerge from the furnace by reducing the moisture content of the enclosed atmosphere, said impurity being chosen of a material readily bondable with the coating material.

3. A method of intimately bonding a coating material to glass fibers comprising the steps of incorporating in the melt a reducible metallic compound chemically active with the coating material, drawing the fibers from the melt, protecting the fibers from moisture as the latter are drawn from the furnace, passing the fibers through a reducing atmosphere as the fibers are drawn from the furnace in a nascent state, and applying a coating material to the resulting fibers.

References Cited in the file of this patent

UNITED STATES PATENTS

| | | |
|---|---|---|
| 2,030,476 | Smith | Feb. 11, 1936 |
| 2,577,936 | Waggoner | Dec. 11, 1951 |
| 2,628,927 | Colbert et al. | Feb. 17, 1953 |
| 2,647,068 | Patai | July 28, 1953 |